United States Patent [19]

Parnkopf et al.

[11] 4,010,797
[45] Mar. 8, 1977

[54] HEAT EXCHANGER
[75] Inventors: Fiske O. Parnkopf; George E. Good, both of Arcadia, Calif.
[73] Assignee: C F Braun & Co, Alhambra, Calif.
[22] Filed: Mar. 4, 1974
[21] Appl. No.: 447,912
[52] U.S. Cl. .................................. 165/159; 122/32
[51] Int. Cl.² ............................................ F28F 9/22
[58] Field of Search ......................... 165/158–160; 122/32, 7

[56] References Cited

UNITED STATES PATENTS

| | | | |
|---|---|---|---|
| 2,491,618 | 12/1949 | Luetzelschwab | 165/159 |
| 2,839,276 | 6/1958 | Rossi | 165/81 |
| 3,008,693 | 11/1961 | Byrns | 165/160 |
| 3,147,743 | 9/1964 | Romanos | 122/32 |
| 3,242,983 | 3/1966 | DeNevers | 165/159 |
| 3,302,620 | 2/1967 | Menzel | 165/159 |
| 3,532,160 | 10/1970 | Garrison | 165/159 |
| 3,545,536 | 12/1970 | Peters | 165/134 |
| 3,572,430 | 3/1971 | Charnock, Jr. | 165/82 |
| 3,662,718 | 3/1971 | Creek et al. | 122/32 |
| 3,749,160 | 7/1973 | Vestre | 122/32 |
| 3,771,497 | 11/1973 | Sprague et al. | 122/7 |

FOREIGN PATENTS OR APPLICATIONS 369,266   3/1932   United Kingdom ............... 165/159

Primary Examiner—Charles J. Myhre
Assistant Examiner—Theophil W. Streule, Jr.
Attorney, Agent, or Firm—Lyon & Lyon

[57] ABSTRACT

A heat exchanger is disclosed which comprises an outer shell, a bundle of heat exchange tubes within the shell and positioned within a tube sheet adjacent one end thereof, and a shroud spaced between the shell and the tubes. The exchanger is constructed so that hot incoming fluid passes over the heat exchange tubes inside of the shroud and then, in its cooled state, passes along the back face of the tube sheet and between the outer surface of the shroud and the inner surface of the shell, so that thermal stresses in the tube sheet are minimized.

4 Claims, 4 Drawing Figures

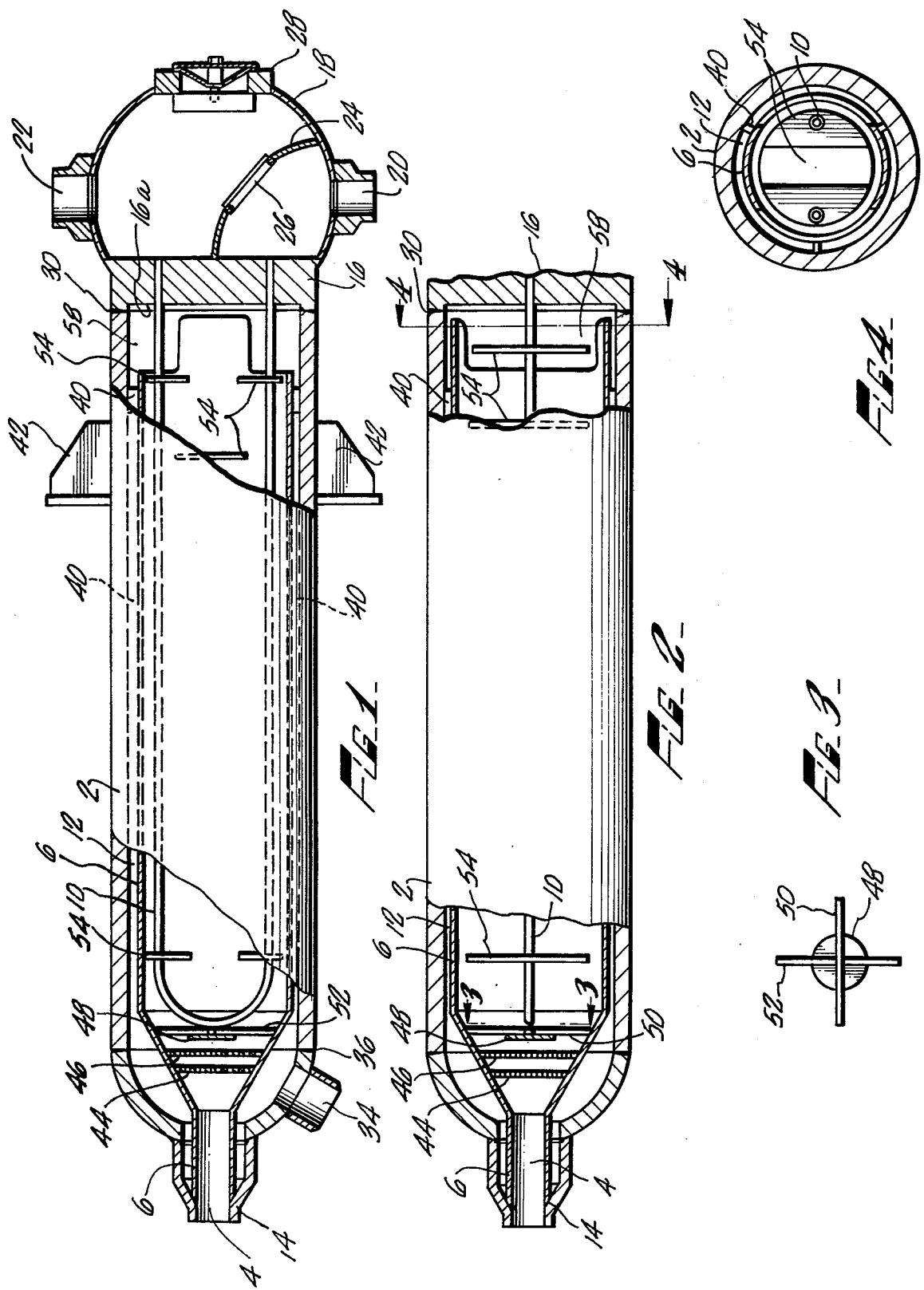

HEAT EXCHANGER

BACKGROUND OF THE INVENTION

Shell and tube exchangers of the general type to which this invention relates are well known. For a detailed description and explanation of the mode of operation of such heat exchangers, reference may be made to standard texts such as George Brown and Associates, UNIT OPERATIONS, 1953, John Wiley and Sons Inc. Such heat exchangers are used in many commercial processes where the heat exchange of fluids is necessary. For example, heat exchangers are used in the manufacture of ammonia gas wherein the synthesized ammonia exits from the ammonia reactor at a temperature of approximately 950° F and is cooled by passing it through a heat exchanger. One example of a process of producing ammonia in which such heat exchangers are used, is U.S. Pat. No. 3,442,613 to Grotz.

In shell and tube heat exchangers for high pressure service, a hot gas is typically cooled by passage through the tube bundle in heat exchange relationship with steam or water which is on the shell side. The hot gas decreases significantly in temperature and part of the water is vaporized to produce steam. Accordingly, such an exchanger may be used not only to cool the hot gas but also as a steam generator.

A problem associated with heat exchangers and steam generators of this type has been the high thermal stresses caused by the large temperature differences through the tube sheet of the exchanger and between the inlet and outlet sides of the tube sheet on the front face where it is separated by the passrib or pass partition. For example, where inlet water in a steam generator is at a relatively low temperature and the water is passed in heat exchange relationship with the hot gas, the tube sheet is subjected to very high thermal stresses due to the large temperature difference between the hot and cold sides of the tube sheet and in the region of the pass partition which separates the hot inlet synthesis gas from the cooled outlet side. These temperature differences may be on the order of as much as 275° to 330° F. It is now recognized that such large thermal stresses can cause a number of problems in a heat exchanger and may even eventually result in failure or leakage of the exchanger.

Another problem which has been found in shell and tube heat exchangers previously utilized is that of crevice corrosion which may occur on the back face of the tube sheet. A small gap exists between the outside diameter of the tubes of the tube bundle and the inside diameter of the openings in the tube sheet through which the tubes extend. In many geographical areas, the feed water which is used to cool the hot effluent contains chlorides, and when the exchanger is shut down for maintenance or for any other purpose, the steam condenses and deposits chlorides in such small gaps which attack the tubes and tube sheet and cause corrosion to occur.

SUMMARY OF THE INVENTION

Minimizing thermal stresses associated with shell and tube type heat exchangers as well as eliminating the problem of crevice corrosion are achieved by putting the hot ammonia synthesis gas in the shell and the cooling water in the tubes and providing a shroud between the outer shell of the heat exchanger and the tube bundle. The shroud is attached to the shell at the gas inlet nozzle end so that the hot incoming gas flows inside the shroud and along the heat exchange tubes. At the opposite end of the heat exchanger, the cooled gas flows across the back surface of the tube sheet and around the shroud. The shell is sealed at that end by the tube sheet so that the cooled gas, after passing around the shroud, flows through an annular passage defined by the inner surface of the shell and the outer surface of the shroud in a direction counter-current to the incoming gas and exits through a nozzle located at the end of the passage and at the same end of the heat exchanger as the inlet nozzle.

By causing the cooled gas to flow along the back face of the tube sheet and along the heat exchanger shell, the temperature difference between the front and back faces of the tube sheet is substantially reduced. By thus reducing the temperature difference across the tube sheet, the thermal stresses resulting from such a difference are, of course, likewise substantially minimized and the possiblity of thermal shock on the front or inlet face of the tube sheet during start-up is also essentially eliminated. By the same token, crevice corrosion which occurs with previously used shell and tube exchangers is eliminated since there is no chloride or other corrosive agent in ammonia synthesis gas, which contacts the back face of the tube sheet, and the water and steam are only within the tubes and hence out of contact with the back face of the tube sheet.

BRIEF DESCRIPTION OF THE DRAWINGS

FIG. 1 is a partially sectioned side view of a shell and tube heat exchanger.

FIG. 2 is a top view, in partial section, of the heat exchanger shown in FIG. 1.

FIG. 3 is a section view taken along line 3—3 of FIG. 2.

FIG. 4 is a sectional view taken along lines 4—4 of FIG. 2.

DESCRIPTION OF THE PREFERRED EMBODIMENT

Referring to FIG. 1, a shell and tube type heat exchanger having an outer shell 2, has at one end an inlet nozzle 4 through which the incoming, hot gases are passed. In a typical ammonia synthesis process, hot gases at temperatures of from 700° to 1200° F may be generated in the catalyst bed, and the effluent gas temperature from modern design synthesis converters generally ranges from 800° F to 1,000° F. Concentrically spaced within the shell and attached to the shell in the area of the inlet nozzle 4 is a shroud 6, which extends longitudinally inside the shell between the heat exchange tubes 10 and the shell 2 to form an annular passage 12. The passage so formed by the shell and the shroud is sealed from the incoming gas by seal 14 which sealably connects the shroud and the shell. Thus, the hot gas from inlet nozzle 4 passes into the interior of the shell containing heat exchange tubes 10. For clarity of illustration, only one heat exchange tube is shown, but of course the usual bundle of tubes is used. The tubes pass through a tube sheet 16, which in turn abutts a spherical channel generally designated 18. The advantages of such a channel, especially when the heat exchanger is used for high pressure service, are fully described in U.S. Pat. No. 2,919,906 assigned to the same assignee as the present invention. The fluid which passes into the tubes enters through inlet 20, flows through the tubes and back to the channel and exits from the heat exchanger via outlet 22. Pass partition 24 separates the incoming fluid from the outgoing fluid. Removable panel 26 provides access to inlet 20 and a removable enclosure assembly 28 provides access to the interior of the spherical channel and facilitates maintenance or repair. It will be understood that various other designs for the inlet and outlet of fluid to the tubes may be used in accordance with this invention.

Tube sheet 16 is integrally connected with shell 2 by weld seam 30. The connection between the tube sheet 16 and the shell 2 is leak proof so that the gas being passed through the shell cannot escape at that end of the heat exchanger and is thus forced to flow in a direction counter-current to the direction of the incoming gas along annular passage 12 and finally through exit nozzle 34. Additional weld seam 36 connects the main body of shell 2 to the end portion containing gas inlet and outlet nozzles 4 and 34 respectively. Shroud 6 is supported and centered along annular passage 12 by shroud guides 40, while the heat exchanger itself stands on supports 42.

The hot gas, after passing through inlet nozzle 4, flows first through baffles 44 and 46 which contain a plurality of holes to permit the gas to pass therethrough, but prevents damage to tubes due to direct impingement. As can be seen best in FIGS. 2 and 3, the gas then passes around impingement baffle 48 which is supported by cross bars 50 and 52, and then in a generally longitudinal direction past baffles 54 placed at intervals along the length of the heat exchange tubes. The tube sheet end of shroud 6 is stopped short of the tube sheet to allow for greater insertion and longitudinal growth of the shroud than the shell under operating conditions.

It should be noted, as can best be seen in FIGS. 1 and 2, that the shroud 6 is cut back from the tube sheet 16 to create outlet ports 58. This permits the cooled gas, after having passed along the length of the heat exchanger tubes, with the resultant drop in temperature, to flow along back side 16a of the tube sheet 16, thereby minimizing the temperature difference between the front and back faces of the tube sheet. Prior exchangers have located the hot inlet gas nozzle at the same end of the heat exchanger as the tube sheet header. Such a design results in the tube sheet being contacted by the hot incoming gas before any cooling can take place. This, in turn, results in the previously discussed temperature difference and very high thermal stresses. The present design obviates this problem by passing the hot gas into the heat exchanger at the end away from the tube sheet so that the gas must pass along the entire length of the heat exchanger tubing, with the resultant drop in temperature, before contacting the tube sheet. After passing the length of the tube, the cooled gas then flows through ports in the shroud and through annular passage 12 and out nozzle 34. As best seen in FIG. 4, the cylindrical shroud 6 is supported at the inlet end and properly positioned within shell 2 by shroud guides 40.

The cooled gas, after being passed along the heat exchange tubing, will have a resultant temperature drop of several hundred degrees depending upon the efficiency of the system. Typically, hot ammonia gas entering at about 900° F will exit at about 635° F. Thus, by passing the cooled gas along or across the back face of the tube sheet, the temperature differential encountered in prior designs is substantially reduced since the temperature of the incoming water is typically about 595° to 600° F. By the same token, the shell is contacted only by the cooled gas and consequently instead of being subjected to temperatures ranging from 953° F at the gas inlet end to 650° F at the tube sheet end is subjected to a relatively uniform temperature of about 650° F along its entire length.

The invention having been particularly shown and described with reference to the preferred embodiment thereof, it will be understood by those skilled in the art that various changes in forms and details may be made therein, without departing from the scope of the invention. Although the heat exchanger has been described with specific reference to heat exchange of ammonia gas, it is to be understood that it is intended for use in other environments and in the heat exchange of liquids as well as gases.

What is claimed is:
1. A heat exchanger comprising an outer shell, a bundle of heat exchange tubes extending longitudinally within said shell, a shroud spaced between said outer shell and said heat exchange tubes to provide an annular passageway therebetween, said shroud sealably attached to said shell at one end within an inlet nozzle so the inlet nozzle is in communication with the heat exchange tubes within said shroud but is sealed from the passage defined by said shell and said shroud, said shell and said inlet nozzle at one end permitting admission of fluid into the shell substantially longitudinally along the heat exchange tubes and the inner surface of the shroud, an outlet nozzle at substantially the same end of the shell as said inlet nozzle for exit of the heat exchanged fluid after passage between the shell and the outer surface of the shroud, and a tube sheet connected to said shell at the end opposite from said inlet nozzle, whereby the cooled heat exchanged fluid passes along the face of said tube sheet and along the outer surface of the shroud at a temperature that minimizes the thermal gradient across said tube sheet and to maintain a relatively uniform temperature along the inner surface of said shell.

2. The heat exchanger of claim 1 wherein the shroud and shell surfaces converge at the inlet nozzle whereby the inlet nozzle is in communication with the inner surface of the shroud and the heat exchange tubes therein.

3. A process of cooling a fluid stream comprising passing a hot fluid through inlet means into a heat exchanger having a shroud spaced between the shell of the heat exchanger and heat exchange tubes contained therein, passing such hot fluid substantially longitudinally along the heat exchange tubes and the inner surface of the shroud to cool the fluid, passing the cooled fluid across the back face of a tube sheet positioned within said exchanger at the end opposite from the inlet thereof, whereby thermal stresses on the front face of the tube sheet in the region of the pass partition are minimized, and further passing such cooled fluid between the outer surface of the shroud and the inner surface of the shell from said inlet means to an adjacent outlet nozzle to minimize the temperature gradient between the front and back faces of the tube sheet and to maintain a substantially uniform temperature along the inner surface of the shell.

4. The process of claim 3 wherein the incoming fluid is a mixture of synthesis gas and ammonia from an ammonia synthesis process at a temperature from about 700° F to 1000° F and is cooled to a temperature from about 500° F to 700° F.

* * * * *